United States Patent
Skotnicki

(10) Patent No.: US 8,492,958 B2
(45) Date of Patent: Jul. 23, 2013

(54) DEVICE FOR CONVERTING THERMAL POWER INTO ELECTRICITY

(75) Inventor: Thomas Skotnicki, Crolles-Montfort (FR)

(73) Assignee: STMicroelectronics (Crolles) SAS, Crolles (FR)

( * ) Notice: Subject to any disclaimer, the term of this patent is extended or adjusted under 35 U.S.C. 154(b) by 522 days.

(21) Appl. No.: 12/911,267

(22) Filed: Oct. 25, 2010

(65) Prior Publication Data
US 2011/0095646 A1 Apr. 28, 2011

(30) Foreign Application Priority Data
Oct. 26, 2009 (FR) ...................................... 09 57490

(51) Int. Cl.
*H02N 2/18* (2006.01)
(52) U.S. Cl.
USPC .......................................... 310/339; 310/307
(58) Field of Classification Search
CPC ................................ H02N 2/186; H02N 10/00
USPC ........................................ 310/339, 306, 307
See application file for complete search history.

(56) References Cited

U.S. PATENT DOCUMENTS

| | | | |
|---|---|---|---|
| 4,053,859 A | 10/1977 | Hollweck | |
| 5,644,184 A * | 7/1997 | Kucherov | 310/306 |
| 6,628,040 B2 * | 9/2003 | Pelrine et al. | 310/307 |
| 7,782,170 B2 * | 8/2010 | Robert | 337/85 |
| 7,928,630 B2 * | 4/2011 | Walitzki | 310/306 |
| 8,237,324 B2 * | 8/2012 | Pei et al. | 310/306 |
| 8,378,558 B2 * | 2/2013 | Skotnicki | 310/339 |
| 2003/0122448 A1 | 7/2003 | Kim et al. | |
| 2003/0160543 A1 | 8/2003 | Lee et al. | |
| 2004/0150298 A1 | 8/2004 | Styblo et al. | |
| 2005/0093398 A1 | 5/2005 | Kim et al. | |
| 2008/0185936 A1 * | 8/2008 | Panchapakesan et al. | 310/306 |
| 2012/0153905 A1 * | 6/2012 | Skotnicki et al. | 322/2 A |
| 2012/0176000 A1 * | 7/2012 | Mitchell et al. | 310/307 |
| 2012/0228992 A1 * | 9/2012 | Skotnicki | 310/306 |
| 2013/0002091 A1 * | 1/2013 | Kim et al. | 310/306 |

FOREIGN PATENT DOCUMENTS

| | | |
|---|---|---|
| BE | 515499 A | 8/1954 |
| DE | 102005025094 A1 | 12/2006 |
| WO | WO 2005/074494 A2 | 8/2005 |

OTHER PUBLICATIONS

French Search Report dated Apr. 15, 2010 from corresponding French Application No. 09/57490.
French Search Report dated Apr. 14, 2010 from related French Application No. 09/57493.
Xu C. et al., *Design of a Micro Heat Engine*, Technical Digest, Micro-Electro-Mechanical Systems (MEMS), vol. 2, pp. 261-267, Nov. 5, 2000.
P.S. Glockner et al., *Recent advances in nano-electromechanical and microfluidic power generation*, International Journal of Energy Research, vol. 31, No. 6-7, pp. 603-618, May 2007.

* cited by examiner

*Primary Examiner* — J. San Martin
(74) *Attorney, Agent, or Firm* — Wolf, Greenfield & Sacks, P.C.

(57) ABSTRACT

A device for converting thermal power into electric power including a plurality of bimetallic strips disposed between a rigid support and a plate of a resilient plastic material; and on the side of the plate of a resilient plastic material opposite to the strips, a layer of a piezoelectric material connected to output terminals, wherein the rigid support is capable of being in contact with a hot source, and the plate of a resilient plastic material is capable of transmitting to the piezoelectric layer the mechanical stress due to the deformations of the bimetallic strips.

25 Claims, 2 Drawing Sheets

DEVICE FOR CONVERTING THERMAL POWER INTO ELECTRICITY

CROSS REFERENCE TO RELATED APPLICATIONS

This application claims the priority benefit of French patent application Ser. No. 09/57490, filed on Oct. 26, 2009, entitled "DEVICE FOR CONVERTING THERMAL POWER INTO ELECTRICITY," which is hereby incorporated by reference to the maximum extent allowable by law.

BACKGROUND OF THE INVENTION

1. Field of the Invention

The present invention relates to a device capable of generating electricity from a heat source, or thermoelectric generator. It especially aims at the exploitation of the thermal power generated by certain types of equipment, for example, a hot surface of an integrated circuit chip, a car muffler, the roof of a house, or any other hot surface.

2. Discussion of the Related Art

In certain mobile devices, for example, telephones, watches, or pacemakers, the use of piezoelectric microgenerators has been provided to generate electricity from the mechanical vibrations resulting from the user's movements. This enables to at least partially recharge the device batteries. A disadvantage of such a solution is that it cannot be used in the case of fixed equipment, for example, a television set or a computer.

Devices capable of directly converting heat into electricity by the Seebeck effect have also been provided. It has indeed been observed that a potential difference appears at the junction of two conductive materials submitted to a temperature difference. However, such devices have a very low efficiency. In practice, the use of the Seebeck effect is mainly limited to temperature measurement applications.

Thermoelectric generators with microturbines have further been provided, which for example comprise turbines having a diameter on the order of 4 mm and capable of being integrated in electronic components. However, such devices are expensive since they comprise rotating mechanical portions which are difficult to form.

SUMMARY OF THE INVENTION

Thus, an object of an embodiment of the present invention is to provide a device for converting thermal power into electric power, which overcomes at least some of the disadvantages of prior art solutions.

An object of an embodiment of the present invention is to provide such a generator which is easy to manufacture.

An object of an embodiment of the present invention is to provide such a generator which is easy to integrate in conventional equipment.

Thus, an embodiment of the present invention provides a device for converting thermal power into electric power, comprising a plurality of bimetallic strips disposed between a rigid support and a plate of a resilient plastic material; and on the side of the plate of a resilient plastic material opposite to the strips, a layer of a piezoelectric material connected to output terminals, wherein the rigid support is capable of being in contact with a hot source, and the plate of a resilient plastic material is capable of transmitting to the piezoelectric layer the mechanical stress due to the deformations of the bimetallic strips.

According to an embodiment of the present invention, the device comprises a wall, on the side of the piezoelectric layer opposite to the plate of a resilient material, this wall being capable of being in contact with a cold source.

According to an embodiment of the present invention, the rigid support is capable of being in contact with the upper surface of an integrated circuit chip and said wall is capable of being in contact with a radiator capable of being assembled on an integrated circuit chip.

According to an embodiment of the present invention, the piezoelectric layer is sandwiched between a lower dielectric layer and an upper dielectric layer.

According to an embodiment of the present invention, electrodes are formed on each main surface of the piezoelectric layer, these electrodes being connected to the output terminals.

According to an embodiment of the present invention, the device comprises from $10^3$ to $10^9$ bimetallic strips per $cm^2$.

According to an embodiment of the present invention, each bimetallic strip comprises a lower layer in contact with a rigid plate, and an upper layer in contact with the plate of a resilient plastic material, the lower layer having a low adherence with respect to the rigid plate.

According to an embodiment of the present invention, the bimetallic strips have, in top view, a rectangular shape.

According to an embodiment of the present invention, the device is capable of being assembled on a hot surface of an automobile vehicle.

According to an embodiment of the present invention, the device is capable of being integrated to a battery charger.

The foregoing objects, features, and advantages of the present invention will be discussed in detail in the following non-limiting description of specific embodiments in connection with the accompanying drawings.

DETAILED DESCRIPTION

Figure 1A:
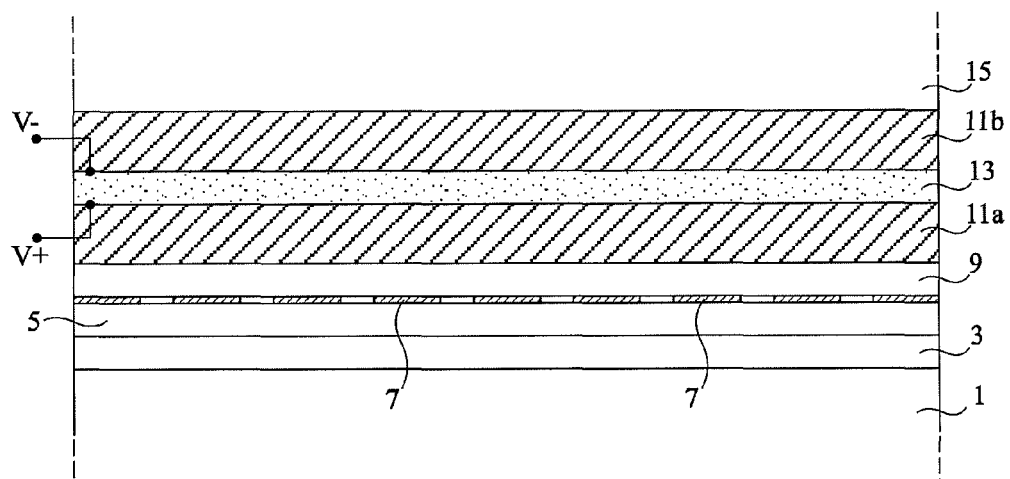
FIGS. 1A to 1C are simplified cross-section views illustrating an embodiment of a thermoelectric generator and its operating principle.

For clarity, the same elements have been designated with the same reference numerals in the different drawings and, further, the various drawings are not to scale.

An aspect of an embodiment of the present invention is to provide a device capable of:

converting thermal power into mechanical power by means of bimetallic strips changing shape when the temperature varies; and converting this mechanical power into electric power by means of a piezoelectric element.

Figure 1B:
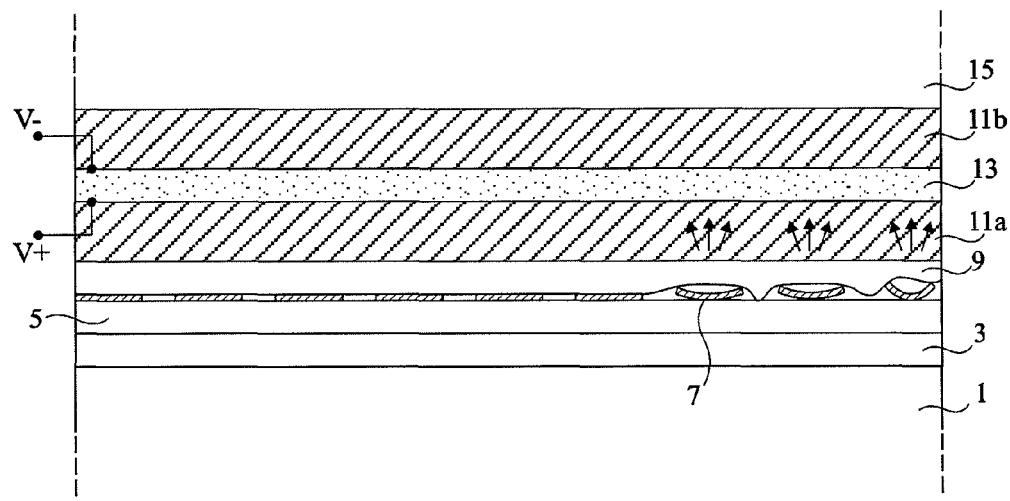
Figure 1C:
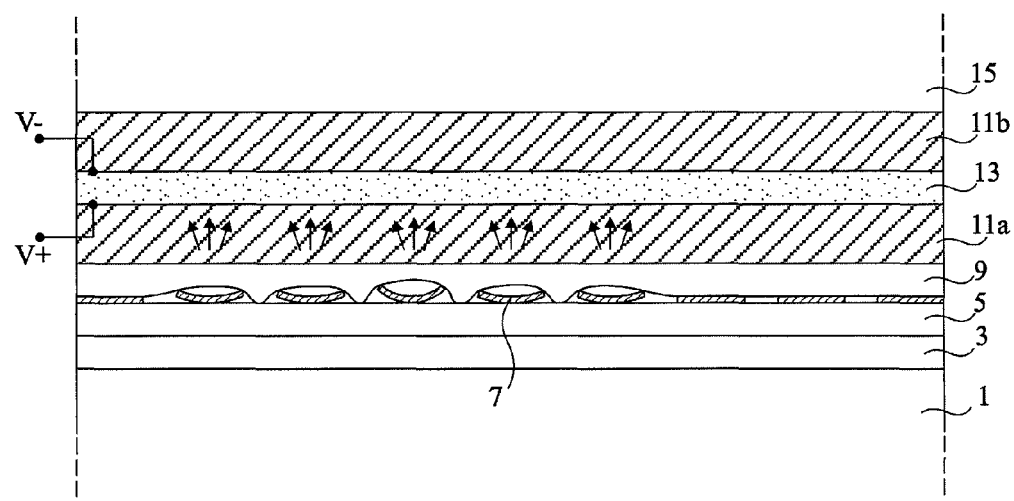

FIGS. 1A to 1C are simplified cross-section views illustrating an embodiment of a thermoelectric generator and its operating principle.

In this example, the thermoelectric generator is formed at the surface of an integrated circuit chip formed inside and on top of a semiconductor substrate 1 and comprising, at the surface of the substrate, a stack 3 of conductive interconnect layers and of insulating layers. In operation, the integrated circuit chip generates heat, and its upper surface for example reaches a temperature ranging between 60 and 125° C.

The thermoelectric generator comprises, above a hot horizontal wall formed by upper surface 3 of the integrated circuit chip, a rigid plate 5 (not compressible) made of a thermally conductive material, for example, a metal.

Above plate 5 are disseminated many bimetallic strips 7. Strips 7 comprise two superposed layers of different materials having different thermal expansion coefficients. When the temperature varies, for example, when it increases, one of the layers of the bimetallic strips expands more than the other. This results in a bending of the strip. Strips 7 are for example selected to take a substantially planar shape, parallel to rigid plate 5, at the ambient temperature.

A plate 9 of a resilient plastic material covers all strips 7 so that strips 7 are sandwiched between non-compressible plate 5 and resilient plate 9.

The thermoelectric generator further comprises, above resilient plate 9, a stack of a lower dielectric layer 11a, of a metallic piezoelectric layer 13, and of an upper dielectric layer 11b.

As an example, dielectric layers 11a and 11b may have a thickness ranging between 0.1 and 30 µm, for example, on the order of 20 µm, piezoelectric layer 13 may have a thickness ranging between 0.1 and 20 µm, for example, on the order of 1 µm, respective resilient and rigid plates 9 and 5 may have a thickness ranging between 0.1 and 50 µm, for example, on the order of 10 µm, and the bimetallic strips may have a thickness ranging between 50 nm and 5 µm, for example, on the order of 1 µm. A large number of bimetallic strips 7 of small dimensions may be provided. For example, on a square chip having a 1-cm side, a number of strips ranging between $10^3$ and $10^9$ will be provided, the strips having, in top view, a rectangular shape.

An element 15 with a planar horizontal surface is arranged above upper dielectric layer 11b and forms a cold wall of the generator. Element 15 may, for example, correspond to the low portion of a radiator capable of being assembled on an integrated circuit chip and comprising fins (not shown) in its upper portion.

FIG. 1B schematically shows a possible state of the thermoelectric generator when, in operation, the integrated circuit chip generates heat.

The present inventor has noticed that the heat transfer between hot and cold walls 3 and 15 of the generator is not homogeneous. Especially, at the level of the stack of plate 5, of strips 7, and of plate 9, the heat initially passes in more privileged fashion through certain local regions of the stack, and less through other regions.

FIG. 1B corresponds to a case where, for some time, the heat passes in more privileged fashion through the right-hand portion of the generator. The temperature of bimetallic strips 7 thus increases more in this region than in others. This results in a bending of strips 7 in this portion of the generator. When they deform, the bimetallic strips crush resilient plastic plate 9. Due to its resilience, plate 9 enables the strips to bend and transmits to piezoelectric layer 13 the mechanical stress due to the strip deformation. This mechanical stress is transformed into an electric signal by the piezoelectric layer. To exploit this signal, thin electrodes (not shown), connected to output terminals $V_+$ and $V_-$ of the generator, may, for example, be formed on the lower and upper surfaces of the piezoelectric layer.

The lifting of the lateral ends of the bimetallic strips tends to degrade, in the concerned region, the thermal conductivity of the stack of rigid plate 5, of strips 7, and of resilient plate 9. Indeed, in this region, the forming of air, gas, or vacuum areas which results from this lifting slows down heat transfers.

The heat flows tend to displace towards other regions of the generator, especially regions in which the bimetallic strips are not bent or deformed, and thus have a good thermal conductivity.

FIG. 10 corresponds to another state of the thermoelectric generator, for example, consecutive to the state shown in FIG. 1B. In this example, a privileged heat transfer path is established in the region located more to the left of the generator. As explained, this results in a deformation of bimetallic strips 7, which then exert a pressure on piezoelectric layer 13.

In the right-hand portion of the generator, strips 7, since they are no longer submitted to a sustained heat flow, cool down and recover a substantially planar shape. The resilience of the material of plate 9 tends to enhance this phenomenon and helps strips 7 to recover their initial shape by exerting compressive vertical stress on their lateral ends.

In practice, due to the large number of strips 7, for example, from $10^3$ to $10^9$ strips per $cm^2$, the pressure/depression phenomenon undergone by piezoelectric layer 13 occurs at a high and almost regular frequency. This phenomenon initiated in local areas randomly covers the entire surface of the generator. This increases as the number of strips increases.

It should be noted that, in an integrated circuit chip, some regions to generate more heat than others, and the location of these heat peaks varies with time. This contributes to cause displacements of the heat flows across the entire surface of the generator. However, the provided thermoelectric generator may also operate when the heat source is perfectly homogeneous in space and time.

Figure 2:
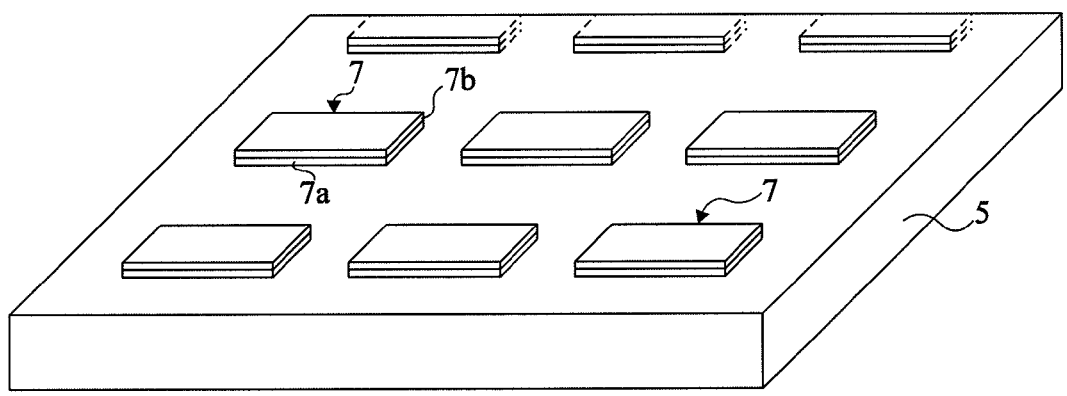
FIG. 2 is a perspective view illustrating an example of a method for forming a thermoelectric generator of the type described in relation with FIGS. 1A to 1C.

FIG. 2 is a perspective view schematically illustrating an example of a method for forming a thermoelectric generator of the type described hereabove.

In this drawing, only plate 5 of a rigid material, and bimetallic strips 7, formed on the upper surface of plate 5, are formed.

After the forming of plate 5, two thin superposed layers of distinct materials are successively deposited over the entire upper surface of plate 5. As an example, a metal with a high thermal expansion coefficient may be selected to form lower layer 7a and a metal with a low thermal expansion coefficient may be selected to form upper layer 7b.

Portions of superposed layers 7a, 7b are then removed by etching to delimit bimetallic strips 7 of the type described hereabove.

It will be ascertained to select the materials, and especially the materials of plate 5 and of layer 7a, so that bimetallic strips 7 are easily separated from plate 5 in deformations linked to temperature variations. If it appears to be necessary, an intermediary step of deposition on plate 5 of a material having a low adherence to the material of layer 7a may be provided before the deposition of layer 7a.

After the forming of strips 7, plate 9 of a resilient plastic material, and dielectric and piezoelectric layers 11a, 13, and 11b (FIG. 1A) are formed by successive depositions. Materials of relatively good thermal conductivity will preferably be selected for all the layers forming the thermoelectric generator, to promote heat transfers from hot wall 3 to cold wall 15.

Specific embodiments of the present invention have been described. Different variations and modifications will occur to those skilled in the art.

In particular, a thermoelectric generator in which a piezoelectric layer enables converting mechanical stress caused by the deformation, under the effect of heat, of bimetallic strips into electric power has been described. It will be within the abilities of those skilled in the art to provide any other layout of the piezoelectric material. As an example, a plurality of thin superposed piezoelectric layers may be provided, with thin electrodes alternately connected to output terminals $V_+$ and $V_-$ separating the piezoelectric layers.

The provision of dielectric layers on each side of the piezoelectric layer has also been provided. These layers especially have the function of insulating the piezoelectric layer from the rest of the generator structure. However, these layers are optional. A generator in which the piezoelectric layer is directly in contact with the plate of a resilient plastic material may, for example, be formed.

Similarly, above-mentioned plate 5 of a non-compressible material is optional. If the generator is directly assembled on a hot rigid surface, for example, the upper surface of an integrated circuit chip, this surface may behave as a rigid support.

Moreover, the use of rectangular bimetallic strips has been mentioned. Any other strip shape capable of deforming when the temperature varies may be provided.

Further, the present invention is not limited to the use of an integrated circuit chip as a heat source to operate the thermoelectric generator. As an example, the generator may be assembled in a package comprising a hot wall and a cold wall, the hot wall being capable of coming into contact with a hot surface such as a metal wall of a car silencer, a braking device of a vehicle, the roof of a house, or any other heat source. The generator may, for example, be assembled in a battery charger capable of recharging batteries from a heat source.

Further, the present invention is not limited to the embodiment mentioned hereabove as an example, nor to the dimensions provided hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device for converting thermal power into electric power, comprising:
   a plurality of bimetallic strips disposed between a rigid support and a plate of a resilient plastic material; and
   on the side of the plate of a resilient plastic material opposite to the strips, a layer of a piezoelectric material connected to output terminals,
   wherein the rigid support is capable of being in contact with a hot source, and the plate of a resilient plastic material is capable of transmitting to the piezoelectric layer the mechanical stress due to the deformations of the bimetallic strips.

2. The device of claim 1, comprising a wall, on the side of the piezoelectric layer opposite to the plate of a resilient material, this wall being capable of being in contact with a cold source.

3. The device of claim 2, wherein the rigid support is capable of being in contact with the upper surface of an integrated circuit chip and said wall is capable of being in contact with a radiator capable of being-assembled on an integrated circuit chip.

4. The device of claim 1, wherein the piezoelectric layer is sandwiched between a lower dielectric layer and an upper dielectric layer.

5. The device of claim 1, wherein electrodes are formed on each main surface of the piezoelectric layer, these electrodes being connected to the output terminals.

6. The device of claim 1, comprising from $10^3$ to $10^9$ bimetallic strips per $cm^2$.

7. The device of claim 1, wherein each bimetallic strip comprises a lower layer in contact with a rigid plate, and an upper layer in contact with the plate of a resilient plastic material, the lower layer having a low adherence with respect to the rigid plate.

8. The device of claim 1, wherein the bimetallic strips have, in top view, a rectangular shape.

9. The device of claim 1, adapted to be assembled on a hot surface of an automobile vehicle.

10. The device of claim 1, adapted to be integrated to a battery charger.

11. A device for converting thermal power into electric power, comprising:
    a plurality of bimetallic strips disposed between a first and second plate, the first plate having a rigidity greater than a rigidity of the second plate; and
    on the side of the second plate opposite to the strips, a layer of a piezoelectric material connected to output terminals.

12. The device of claim 11, wherein the first plate is capable of being in contact with a hot source, and the second plate is capable of transmitting to the piezoelectric layer the mechanical stress due to the deformations of the bimetallic strips.

13. The device of claim 12, comprising a wall, on the side of the piezoelectric layer opposite to the second plate, this wall being capable of being in contact with a cold source.

14. The device of claim 12, wherein the piezoelectric layer is sandwiched between a lower dielectric layer and an upper dielectric layer.

15. The device of claim 12, wherein electrodes are formed on each main surface of the piezoelectric layer, these electrodes being connected to the output terminals.

16. The device of claim 12, comprising from 103 to 109 bimetallic strips per cm2.

17. The device of claim 12, wherein each bimetallic strip comprises a lower layer in contact with a rigid plate, and an upper layer in contact with the second plate, the lower layer having a low adherence with respect to the rigid plate.

18. The device of claim 12, wherein the bimetallic strips have, in top view, a rectangular shape.

19. The device of claim 12, adapted to be assembled on a hot surface of an automobile vehicle.

20. The device of claim 12, adapted to be integrated to a battery charger.

21. A device for converting thermal power into electric power, comprising:
    a deformable layer comprising a plurality of deformable regions, the deformable regions altering from a planar shape to a bent shape when heated;
    a heat source, wherein the heat source heats at least one of the deformable regions into the bent shape, thereby decreasing the thermal conductivity in the at least one deformable region in the bent shape and displacing heat towards the other deformable regions in the planar shapes; and
    a layer of piezoelectric material cooperating with the deformable layer, the layer of piezoelectric material connected to output terminals, the layer of piezoelectric material generating electricity in response to deformations of the deformable regions.

22. The device of claim 21, wherein the layer comprising deformable regions is disposed between a first and second plate, the first plate being adjacent to the heat source and the piezoelectric material being arranged on the side of the second plate opposite to the layer comprising deformable regions.

23. The device of claim 22, wherein the first plate comprises a plate having a rigidity greater than a rigidity of the second plate, so that when the at least one deformable region is heated into the bent shape, the deformable region compresses the second plate which is capable of transmitting mechanical stress from the compression to the piezoelectric material connected to output terminals, and wherein the second plate exerts a reaction force on the at least one deformable region in the bent shape to expedite recovery of the at least one deformable region in the bent shape into the planar shape.

24. The device of claim 21, wherein the deformable layer comprises between about $10^3$ and about $10^9$ deformable regions per $cm^2$.

25. The device of claim 21, wherein the deformable regions comprise bimetallic strips.

* * * * *